MEMORY SENSE GATING SYSTEM

Filed June 21, 1965

INVENTOR
WILLIAM J. TAREN

BY Carl C. Kling
ATTORNEY 3,418,647
MEMORY SENSE GATING SYSTEM

William Joseph Taren, Poughkeepsie, N.Y., assignor to International Business Machines Corporation, Armonk, N.Y., a corporation of New York Filed June 21, 1965, Ser. No. 465,337
4 Claims. (Cl. 340—174)

This invention relates to a memory sensing system, and particularly to a gating system for controlling the application of noise-containing memory output signals to a sense amplifier in such fashion that the noise is minimized.

Memory sensing systems generally include some technique for isolating the sense amplifiers from noise developed during driving of the memory. The strobing technique samples the output of the sense amplifier at a time when noise is believed to be minimal. Various balancing techniques, in which noise known to be present is divided into equal portions and applied in differential fashion to a sense amplifier, are also used. The noise is subject to common mode rejection across the differential inputs of the sense amplifier. The characteristics of magnetic memories, however are such that the noise signal normally present may be an order of magnitude greater than the sense signal and may occur at the same time or very nearly. The sense amplifier, which must be sufficiently powerful to accept the very small sense output signal, is normally subject to saturation by the relatively large noise signals. The techniques for isolating the sense amplifier from the noise signals normally require additional windings in the memory array, so that the winding which is connected to the sense amplifier is not connected to the major source of noise. A need persists for a technique of isolating the sense amplifier without the need for additional windings.

CHARACTERISTICS OF THE INVENTION

*Environment*

The invention is useful as a sense gating system for a magnetic memory. It performs the function of strobing, not at the output of the sense amplifiers but rather at the inputs of the sense amplifier. A controllable transformer is arranged between these sense conductors and the sense amplifiers. This controllable transformer is arranged to be nontransmittive to the noise singals, but to provide a low impedance transmission path for the sense signals when a strobe signal is applied.

*Objects*

An object of the invention is to provide an improved sensing system for magnetic memories.

Another object of the invention is to provide for strobing of output signals of magntic memories prior to their application to the sense amplifier.

Another object of the invention is to provide a noiseless connection of signal outputs from a memory to the sense amplifier.

*Features*

A feature of the invention is the connection of a controllable orthogonal mode transformer between the sense conductors of a memory and the sense amplifiers.

Another feature of the invention is the use of a magnetically coated conductive apertured strip as a controllable transformer located between the source of noise and signals and the utilization circuit for such signals.

*Advantages*

An advantage of the invention is the protection of sense amplifiers from noise signals which might saturate it.

Another advantage of the invention is the packaging advantage gained by the use of long thin flat sense gate transformers.

The foregoing and other objects, features and advantages will be apparent from the following more particular description of a preferred embodiment of the invention, as illustrated in the accompanying drawings.

*Drawings*

SUMMARY OF THE INVENTION

The invention is a sensing system, for a matrix storage device, which features a controllable transformer connected between the sense conductor and the sense amplifier. The controllable transformer is activated by a strobe signal timed to make the transformer transmittive to data signals on the sense conductor but nontransmittive to noise signals occurring at other than data time. Controllable transformer 11 is an apertured conductor coated with magnetic material, operated in an orthogonal mode. Each aperture is connected with the sense conductor as the primary winding and with a connector to the sense amplifier as a secondary winding. The data signal is coupled from primary to secondary winding only if the controllable transformer is in the transmittive state or hard direction.

The controllable transformer 11 is rendered transmittive by the strobe pulse which provides a magnetic field which is nondirectional with respect to the magnetic material about each aperture. This magnetic field produced by the longitudinal current divides into half currents on each side of the aperture and puts the magnetic material in a direction at right angles to the circular path about the aperture. Immediately thereafter a data signal applied on the primary winding, which passes through the aperture, drives the magnetic material toward the circular path about the aperture. The resulting change of magnetic flux causes an output signal to be induced in the secondary winding which is applied to the sense amplifier input. In the absence of a strobe pulse the magnetic material about the aperture remains in a circular easy axis direction about the aperture and is not in a condition to experience flux change resulting from a data signal on the primary winding.

Figure 1:
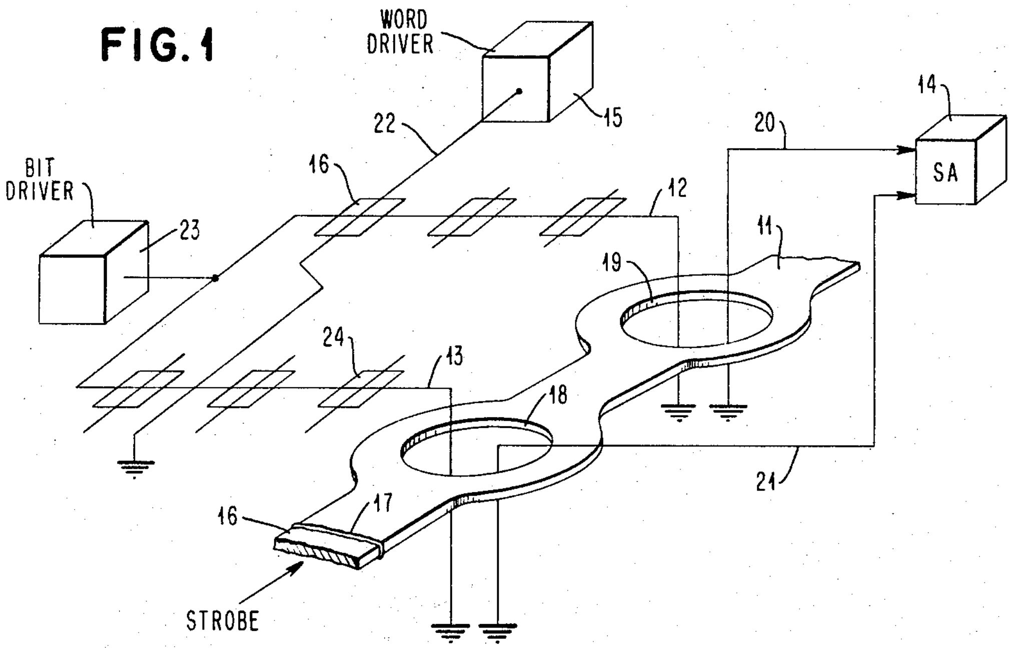
FIGURE 1 is a diagram of the invention.
Figure 2:
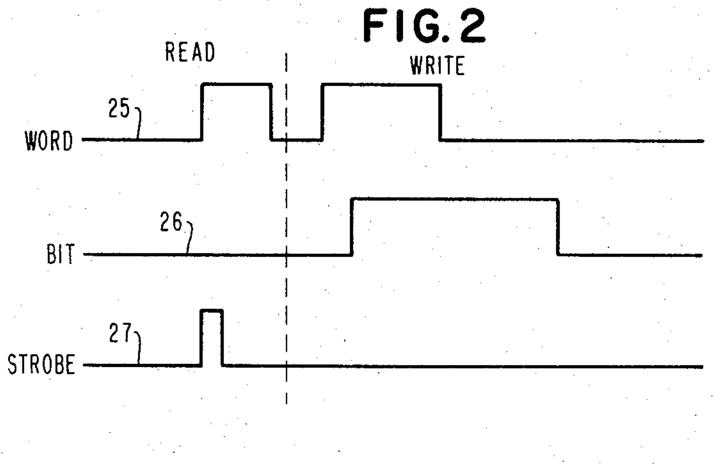
FIGURE 2 is a diagram of the pulse program for use with the invention.

*Details of the invention—FIGURES 1 and 2*

The invention is a sense gating system for use with a magnetic storage device. The sense gating system includes a controllable transformer connected between the sense conductors and the sense amplifiers. The controllable transformer is normally non-transmittive to signals from the sense conductors. At signal time, however, the controllable transformer is activated by a strobe signal which makes it transmittive to signals applied on the sense conductors. The controllable transformer thus serves as a strobe device connected between the signal source and the sense amplifiers.

Controllable transformer core 11 is connected in a manner necessary to control the application of signals from sense conductors 12 and 13 to sense amplifier 14. During operation, word driver 15 provides full read signal to an appropriate word of bit storage elements including bit storage element 16. Bit storage element 16 at this time provides an output signal along conductor 12 to the primary of controllable transformer 11. Transformer 11 is supplied with a strobe pulse applied to its internal conductor 16 at this time. The stroke pulse applied to conductor 16 supplies a magnetic field which places magnetic coating 17 in a broken up magnetic state around the apertures 18 and 19 in such fashion that the magnetic material around the apertures can be switched by a signal applied to its primary winding, which passes through the aperture. The signal from bit storage element 16, applied on primary winding 12 of transformer element 19, thus switches the magnetic material and induces a signal on conductor 20. This signal is applied to sense amplifier 14. Since there is no accompanying output signal induced on conductor 13, there is no output signal on conductor 21, which is connected at this time for common mode rejection with conductor 20.

FIGURE 2 shows the pulse program. Word drive current timed according to line 25 provides full read magnetic field, driving each of the storage elements to a reference state and causing production of output signals according to the magnetic state of the storage element with respect to the reference state. There is no write bit current field (see line 26) at this time. Stroke pulse 27, however, is active and results in a transmittive state for controllable transformer 11.

Any noise impulses from driver 15 on conductor 22 have equal results on conductors 12 and 13 and thus provide transformer links 18 and 19 with equal signals on conductors 20 and 21 which are rejected in common mode across the differential input of sense amplifier 14. The controllable transformer 11 thus controls the input to the sense amplifier according to the strobe pulse.

In a normal cycle, the write portion of the cycle follows the read portion of the cycle to write data into the particular bit storage element. The combination of the pulse on a word conductor and any accompanying pulse at right angles to the word conductor, sets the related bit selectively to the 1 or the 0 state. The word and bit noise during write time are of such magnitude that they each would deeply saturate sense amplifier 14. Controllable transformer 14, however, is at this time in the nontransmittive state, since strobe pulse 27 is missing. The controllable transformer 11 is similar to the chain storage element. This storage element operates in orthogonal mode, by the combination of a directionless field and a directionless circular field around an aperture. The field lowers the switching threshold of the magnetic material around the apertures; the circular field switches the magnetic material around an aperture to one or the other of the two circular directions. The directionless field is produced by a current pulse applied longitudinally, which puts the magnetic material about an aperture in a number of magnetic directions which effectively balance out to be directionless. In this state the magnetic material is susceptible to switching to one or the other of the two circular directions, according to the field produced by a current on a wire through the aperture.

*Construction*

The chain storage element is essentially flat, with the chains arrayed in flat planes. The controllable transformer has the same configuration and can conveniently be packaged as if it were an additional storage element in the plane.

*Concluding summary*

The invention is a memory sensing system featuring an orthogonal mode controllable transformer, as a strobing device, located between the source of noise and signal and the sense amplifier, to isolate the sense amplifier from saturating noises developed at other than stroke times.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for coupling a memory sense conductor to a sense amplifier, comprised of:

(a) a controllable transformer, having a primary winding, a secondary winding and a control input;
(b) means connecting the sense conductor to said primary winding;
(c) means connecting the secondary winding to said sense amplifier;
(d) a source of strobe timing pulses;
(e) a source of data read pulses arranged to develop a data signal on the sense conductor;
(f) a source of strobe pulses timed so that each strobe pulse coincides in time with the occurrence of maximum amplitude of data signal; and
(g) means connecting said source of strobe timing pulses to the control input of said controllabe transformer;

whereby said controllable transformer serves as a strobe gate intermediate between the source of signal and the sense amplifier.

2. A circuit according to claim 1 wherein said controllable transformer operates in the orthogonal mode.

3. A circuit according to claim 2 wherein said controllable transformer is made up of an apertured strip of conductive material coated with a thin layer of magnetic material in such fashion that a current applied to the conductor causes a temporary orientation of said magnetic material such that the transformer provides a low impedance connection for sense signals between said primary conductor and secondary winding.

4. A circuit for coupling a pair of memory sense conductors to a memory sense amplifier, characterized by:

(a) a controllable transformer, having a plurality of primary windings, a plurality of secondary windings and a control input terminal;
(b) means connecting the sense conductors to said primary windings;
(c) means connecting said secondary windings to said sense amplifier;
(d) a source of strobe timing pulses;
(e) a source of data read pulses arranged to develop a data signal on one of the sense conductors;
(f) a source of stroke pulses timed so that each strobe pulse coincides in time with the occurrence of maximum amplitude of data signal; and
(g) means connecting said source of strobe timing pulses to the control input of said controllable transformer;

whereby said controllable transformer serves as a strobe gate intermediate between the source of signals and the sense amplifier.

References Cited

UNITED STATES PATENTS 3,293,626 12/1966 Thome ------------- 340—174
3,371,327 2/1968 Anderson et al. ------ 340—174

BERNARD KONICK, *Primary Examiner.*

B. L. HALEY, *Assistant Examiner.*

U.S. Cl. X.R.

307—88